(12) United States Patent
Bheda et al.

(10) Patent No.: US 7,294,671 B2
(45) Date of Patent: *Nov. 13, 2007

(54) REACTIVE CARRIERS FOR POLYMER MELT INJECTION

(75) Inventors: Jayendra H. Bheda, Spartanburg, SC (US); Banks M. Moore, IV, Spartanburg, SC (US)

(73) Assignee: Invista North America S.a.r.L., Wilmington, DE (US)

( * ) Notice: Subject to any disclaimer, the term of this patent is extended or adjusted under 35 U.S.C. 154(b) by 289 days.

This patent is subject to a terminal disclaimer.

(21) Appl. No.: 10/773,490

(22) Filed: Feb. 6, 2004

(65) Prior Publication Data

US 2005/0176881 A1    Aug. 11, 2005

(51) Int. Cl.
*C08G 63/60* (2006.01)
*C08G 63/02* (2006.01)

(52) U.S. Cl. .................. 524/599; 528/271; 528/272

(58) Field of Classification Search ........ 524/599; 525/218, 296, 599; 528/271, 272
See application file for complete search history.

(56) References Cited

U.S. PATENT DOCUMENTS

| | | | | |
|---|---|---|---|---|
| 5,663,029 A | * | 9/1997 | Malhotra | 430/126 |
| 5,693,681 A | * | 12/1997 | Pfaendner et al. | 521/48 |
| 5,695,905 A | * | 12/1997 | Savariar-Hauck et al. | 430/162 |
| 5,925,710 A | | 7/1999 | Wu et al. | |
| 6,342,578 B1 | * | 1/2002 | Huang | 528/271 |
| 6,372,813 B1 | * | 4/2002 | Johnson et al. | 522/114 |
| 6,569,991 B2 | | 5/2003 | Nichols | |
| 6,573,359 B2 | | 6/2003 | Nichols et al. | |
| 6,590,069 B2 | | 7/2003 | Nichols et al. | |
| 6,599,596 B2 | | 7/2003 | Nichols et al. | |
| 6,630,050 B1 | * | 10/2003 | Moeller et al. | 156/331.7 |

FOREIGN PATENT DOCUMENTS

| JP | 06100767 | * | 4/1994 |
|---|---|---|---|
| JP | 06100767 A | * | 4/1994 |

OTHER PUBLICATIONS

K.J. Saunders, Organic Polymer Chemistry, 1983, Chapman and Hall, Second Edition, p. 192.*
Sigma-Aldrich product data, from www.sigmaaldrich.com, 6 pages.*

* cited by examiner

*Primary Examiner*—Randy Gulakowski
*Assistant Examiner*—A. Toscano
(74) *Attorney, Agent, or Firm*—Craig M. Sterner

(57) ABSTRACT

The present invention concerns a reactive carrier that forms no by-products during melt injection of polymer into articles such as sheets, films, fibers and containers. The reactive carrier is used to mix additives into the polymer resin. More particularly, the invention relates to the use of one or more cyclic anhydrides or substituted cyclic anhydrides as the reactive carrier. The polymer can be polyester or polyamide. Suitable cyclic anhydrides are those with a melt point of less than the polyester or polyamide, preferably less than about 160° C., and more preferably less than about 125° C. Most preferable are cyclic anhydrides with a melt point less than about 100° C. and especially suitable are those that are liquid at room temperature (25° C.). The cyclic anhydride may be selected from the group of succinic anhydride, substituted succinic anhydride, glutaric anhydride, substituted glutaric anhydride, phthalic anhydride, substituted phthalic anhydride, maleic anhydride, substituted maleic anhydride, or mixtures of two or more of these.

15 Claims, No Drawings

REACTIVE CARRIERS FOR POLYMER MELT INJECTION

BACKGROUND OF THE INVENTION

1) Field of the Invention

The present invention concerns a reactive carrier that forms no by-products during melt injection of polymer into articles such as sheets, films, fibers and containers. The reactive carrier is used to mix additives into the polymer resin. More particularly, the invention relates to the use of one or more cyclic anhydrides or substituted cyclic anhydrides as the reactive carrier. The polymer can be polyester or polyamide.

2) Prior Art

In many injection molded polymer articles additives are required to improve the functionality of the article. Typical additives are colorants, anti-slip agents, flame retardants, antioxidants, gas barrier agents, ultraviolet (UV) radiation absorbers, acetaldehyde reducing agents, crystallization control agents, fillers and the like.

A "masterbatch" approach has been used to mix additives into injection molded polymer articles. In the masterbatch process, the desired additive is dispersed at a relatively highly concentrated level within a carrier polymer. In a following process step, the masterbatch of highly concentrated additive polymer is blended with virgin polymer at the feed throat of the melt extruder. Depending on the quality of the process control of the drying and metering of the masterbatch, variations in additive levels and the polymer molecular weight can be unacceptable.

An alternative method is to use a liquid dispersion of the additive that is pumped at the extruder throat. The liquid carrier must be organic, non-aqueous, soluble in the polymer and have a boiling point greater than the extrusion temperature, i.e. generally above 300° C. Commercial liquid carriers can be obtained from ColorMatrix Corporation, Cleveland, Ohio and designated as ColorMatrix LCPY-1: 82-89 Series. According to the material safety data sheet (MSDS) from ColorMatrix Corporation, the main named ingredient is refined hydrocarbon oil.

The problem with the use of liquid carriers is that they can effect the processing of the article and remain in the article. For instance they can cause the extruder screw to slip, plate out on the molds and can be extracted.

U.S. Pat. Nos. 6,569,991, 6,573,359, 6,590,069 and 6,599,596 to Nichols et al. disclose the use of a reactive carrier that reacts with the condensation polymer, thereby binding the reactive carrier in the polymer resin and preventing the emergence of the carrier from the polymer resin during subsequent thermal processing. These patents show in the Figures the effect of the reactive carrier molecular weight on the theoretical loss of molecular weight for condensation polymers as a function of the concentration of the reactive carrier (i.e. use of the specified reactive carrier causes a loss of molecular weight of the polymer). High molecular weight (less than 10,000 g/mol) reactive carriers are preferred, especially polyols and most preferred polyethylene glycols with a molecular weight between about 400 and 1000 g/mol.

U.S. Pat. No. 6,342,578 to Huang discloses a polyester with one or more of phthalic anhydride, glutaric anhydride, benzoic anhydride, maleic anhydride or succinic anhydride in an amount sufficient to significantly reduce the caustic stress cracking. The anhydrides reacted with the hydroxyl end groups to form carboxyl end groups (CEG).

There is a need for reactive carriers that do not reduce the molecular weight of the polymer.

SUMMARY OF THE INVENTION

The inventors have found that cyclic anhydrides, and in particular substituted cyclic anhydrides can be used as reactive carriers without forming by-products that reduce the molecular weight of the polymer.

In the broadest sense, the present invention relates to the use of a liquid cyclic anhydride at the time it is injected, as a carrier of additives in a polymer that is melt extruder into an article.

In the broadest sense, the invention also comprises a method of injecting a liquid cyclic anhydride containing additives into a melt extrusion process. The anhydride is liquid at the time of injection.

DETAILED DESCRIPTION OF THE PROCESS

Cyclic anhydrides will react with any nucleophilic group, including hydroxyl, carboxyl, primary and secondary amines and amides. This means that they are best suited as reactive carriers in polyesters and polyamides.

Suitable cyclic anhydrides are those with a melt point of less than that of the polyester or polyamide. Preferable are cyclic anhydrides with a melt point less than about 160° C., most preferable are cyclic anhydrides with a melt point of less than 100° C., and especially suitable are those that are liquid at room temperature (25° C.).

Polyethylene terephthalate (PET) is conventionally made by reacting either dimethyl terephthalate or terephthalic acid with ethylene glycol, for example, via an esterification reaction, followed by a polycondensation reaction. When making PET, either in a batch or continuous process, the reactions can be driven to near completion, yielding PET having up to 3 weight percent of diethylene glycol and other byproducts. PET is meant to include small amounts of byproducts.

Conventional continuous production of PET is well known in the art and comprises reacting terephthalic acid and ethylene glycol at a temperature of approximately 200° to 250° C. forming monomer and water. Because the reaction is reversible, the water is continuously removed, driving the reaction to the production of monomers and some oligomers. Next the monomers and oligomers undergo polycondensation reaction in vacuum conditions at a temperature of approximately 250° to 290° C. to form polyester having an IV of about 0.4 to 0.6. During the esterification reaction, no catalyst is needed. However, in the polycondensation reaction, a catalyst such as an antimony compound or titanium compound is necessary.

PET is also made in batch and continuous processes from the reaction of the ester-dimethyl terephthalate and ethylene glycol, at a reaction temperature of approximately 190° to 230° C. forming alcohol (methanol) and monomer. This esterification reaction is reversible and the alcohol must be continuously removed, driving the reaction to the production of monomer and some oligomer. In the reaction of dimethyl terephthalate and ethylene glycol, catalysts such as manganese, zinc, cobalt or other conventional catalyst are employed. Next, the monomer and oligomer undergo a polycondensation reaction at the conditions stated above to form polyester or copolyester having an IV of about 0.4 to 0.6. Making a copolyester of PET and a dicarboxylic acid merely requires the addition of the acid or its ester equivalent, for example, to also undergo an esterification (or transesterification) reaction. Making a copolyester of PET and a diol merely requires the addition of the diol during esterification (or transesterification). For use as a bottle resin the polyester or copolyester from this melt phase reaction is solid state polymerized by conventional methods to increase the resin molecular weight (IV).

Resins containing up to 20 wt % of the dicarboxylic acid are useful in forming bottles or jar containers as is known in the art. Suitable diacids may be aliphatic, alicyclic, or aromatic dicarboxylic acids such as isophthalic acid, 1,4-cyclohexanedicarboxylic acid; 1,3-cyclohexanedicarboxylic acid, succinic acid, glutaric acid, adipic acid, sebacic acid, 1,12-dodecanedioic acid; 2,6-naphthalenedicarboxylic acid, bibenzoic acid, oxalic acid, malonic acid, pimelic acid, suberic acid, azelaic acid, maleic acid, fumaric acid, phthalic acid, hemimellitic acid, trimellitic acid, trimesic acid, or mixtures of these and their equivalents. It is often preferred to use a functional acid derivative equivalent such as dimethyl, diethyl, or dipropyl ester of the dicarboxylic acid.

Alternatively, polyester resins may optionally be modified by up to 20 wt % of one or more different diols than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,2-cyclohexanedimethanol, 1,3-cyclohexanedimethanol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4 hydroxypropoxyphenyl)-propane.

Polyamides means polyamides made from the condensation of aliphatic or aromatic diamines with dicarboxylic acids, or the condensation of lactams. The preferred polyamides are nylon 66 and nylon 6.

Article means films, sheets for thermoforming, fibers, and injection molded parts in particular preforms for stretch blow molding into containers.

In a preferred embodiment the cyclic anhydride carrier containing additives is injected into the melt extrusion process. The injection occurs in the melt piping conducting the molten polymer to the article forming device, such as film or fiber forming machines.

In another embodiment the cyclic anhydride carrier containing additives is added at the end of a continuous polymerization process in the transfer pipe between the final reactor and the die that forms the strands that are cooled and chipped. Optionally this resin can be solid-state polymerized to a higher molecular weight (IV).

In the preferred embodiment the cyclic anhydride liquid carrier containing additives is added into a mixing box at the throat of the extruder of the preform injection molding or extrusion blow molding machine. For this process it is preferred that the liquid carrier has a melting point near or below ambient temperatures. This simplifies the addition of the anhydride into the extruder, as complicated heating systems are not required.

For stretch blow molding containers, the preform is heated to about 100-120° C. and blown-molded into contour bottle at a stretch ratio of about 12.5. The stretch ratio is the stretch in the radial direction times the stretch in the length (axial) direction. Thus if a preform is blown into a bottle, it may be stretched about two times its length and stretched about six times is diameter giving a stretch ratio of twelve (2×6). Since the bottle size is fixed, different preform sizes can be used for obtaining different stretch ratios.

The preferred carriers are cyclic anhydrides, selected from the following classes:

a) succinic anhydrides

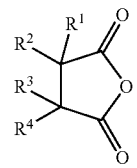

where $R^1$, $R^2$, $R^3$ and $R^4$ can be hydrogen, alkyl, alkenyl or aryl groups.

Included in this class of succinic anhydrides are cycloalkane and cycloalkene substituents, giving such compounds as hexahydrophthalic anhydride and substituted hexahydrophthalic anhydride:

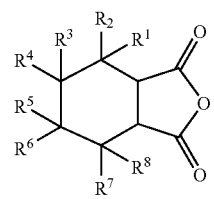

where $R^1$, $R^2$, $R^3$, $R^4$, $R^5$, $R^6$, $R^7$ and $R^8$ can be hydrogen, alkyl, alkenyl or aryl groups.

Also included in this class are itaconic (2-methylene succinic anhydride) and substituted itaconic anhydrides:

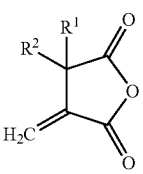

where $R^1$ and $R^2$ can be hydrogen, alkyl, alkenyl or aryl groups.

From this class, the mono-alkenyl substituted succinic anhydrides are preferred. The most preferred are the $C_8$ to $C_{20}$ alkenyl groups.

a) maleic anhydride

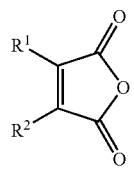

where $R^1$ and $R^2$ can be hydrogen, alkyl, alkenyl or aryl groups.

Also included in this class are cycloalkane and cycloalkene substituents, giving such compounds as 3,4,5,6-tetrahydrophthalic anhydride and substituted tetrahydrophthalic anhydride groups:

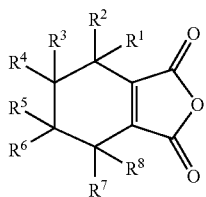

where $R^1$, $R^2$, $R^3$, $R^4$, $R^5$, $R^6$, $R^7$ and $R^8$ can be hydrogen, alkyl, alkenyl or aryl groups; and substituted 1-cyclopentene-1,2-dicarboxylic anhydride:

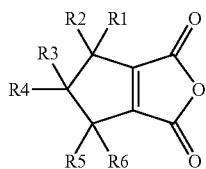

where $R^1$, $R^2$, $R^3$, $R^4$, $R^5$ and $R^6$ can be hydrogen, alkyl, alkenyl or aryl groups.

From this class, maleic anhydride and 2-methyl maleic anhydride (citraconic anhydride) are preferred.

a) glutaric anhydride

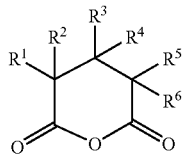

where $R^1$, $R^2$, $R^3$, $R^4$, $R^5$ and $R^6$ can be hydrogen, alkyl, alkenyl or aryl groups.

From this class, glutaric anhydride and 2-ethyl-3-methyl glutaric anhydride are preferred.

a) diglycolic anhydride

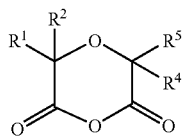

where $R^1$, $R^2$, $R^3$ and $R^4$ can be hydrogen, alkyl, alkenyl or aryl groups.

a) phthalic anhydride

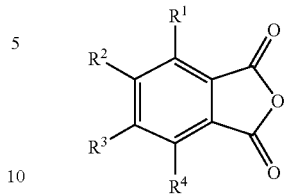

where $R^1$, $R^2$, $R^3$ and $R^4$ can be hydrogen, alkyl, alkenyl or aryl groups.

a) diphenic anhydride

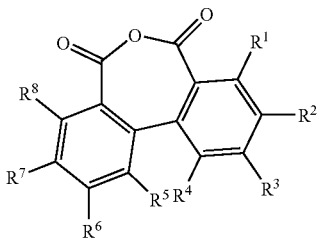

where $R^1$, $R^2$, $R^3$, $R^4$, $R^5$, $R^6$, $R^7$ and $R^8$ can be hydrogen, alkyl, alkenyl or aryl groups.

Table 1 summarizes melting point of selected cyclic anhydrides.

TABLE 1

| Cyclic anhydride | Melting Point (° C.) |
| --- | --- |
| Succinic anhydride | 119-120 |
| methyl succinic anhydride | 33-35 |
| 2,2-dimethylsuccinic anhydride | 29-31 |
| phenyl succinic anhydride | 53-55 |
| octadecenylsuccinic anhydride | liquid at RT* |
| hexadecenyl succinic anhydride | liquid at RT* |
| eicosodecenyl succinic anhydride | liquid at RT* |
| 2-methylene succinic anhydride | 66-68 |
| n-octenyl succinic anhydride | liquid at RT* |
| nonenyl succinic anhydride | 8-12 |
| tetrapropenyl succinic anhydride | 14 |
| dodecyl succinic anhydride | 40 |
| Glutaric anhydride | 55-57 |
| 3-methylglutaric anhydride | 43-47 |
| phenyl glutaric anhydride | 95-99 |
| diglycolic anhydride | 92-93 |
| 2-ethyl 3-methyl glutaric anhydride | liquid at RT* |
| 3,3-dimethyl glutaric anhydride | 124-126 |
| 2,2-dimethyl glutaric anhydride | 34-38 |
| 3,3-tetramethyleneglutaric anhydride | 64-66 |
| Phthalic anhydride | 131-134 |
| 4-methyl phthalic anhydride | 90-92 |
| 4-t-butyl phthalic anhydride | 70-75 |
| tetrahydrophthalic anhydride | 70-74 |
| hexahydrophthalic anhydride | 34-38 |
| Maleic anhydride | 54-56 |
| 2-methyl maleic anhydride | 7-8 |
| 3,4,5,6-tetrahydrophthalic anhydride | 69-73 |
| 1-cyclopentene-1,2-dicarboxylic anhydride | 46-49 |
| dimethyl maleic anhydride | 93-96 |
| diphenyl maleic anhydride | 159-162 |

*RT means room temperature

For the process where the cyclic anhydride is added at the preform injection molding stage, low melting points, preferably below 50° C. are used. The preferred cyclic anhydrides are the alkenyl succinic anhydrides such as octadecenylsuccinic, hexadecenyl succinic and eicosodecenyl succinic anhydride, or mixtures thereof.

Additives according to the present invention are colorants, anti-slip agents, flame retardants, antioxidants, gas (oxygen and carbon dioxide) barrier agents, oxygen scavengers, ultraviolet (UV) radiation absorbers, acetaldehyde reducing agents, crystallization control agents, impact modifiers, catalyst deactivators, melt strength enhancers, antistatic agents, lubricants, chain extenders, nucleating agents, solvents, fillers, and plasticizers.

The additives are mixed with the reactive carrier at the required concentration for the functional purpose for which they are used. The preferred reactive carrier level to be injected or mixed with the polymer is about 1 wt-% or less (100 ppm-10,000 ppm). Any additive used with a reactive carrier should not react with the liquid carrier prior to the addition to the polymer.

TESTING PROCEDURES

Melting Point

The melting point of the cyclic anhydrides is measured with a hot stage microscope. The hot stage is heated rapidly at first and then adjusted to 2° C./min. during the last 10° C. preceding the expected melting point. The melting point is defined as the range from the temperature that melting is first observed to that at which melting is complete.

IV

Intrinsic viscosity (IV) of the polymer is determined by mixing 0.2 grams of an amorphous polymer composition with twenty milliliters of dichloroacetic acid at a temperature of 25° C. using an Ubbelhode viscometer to determine the relative viscosity (RV). RV is converted to IV using the ISO certificated equation:

$$IV=[(RV-1)\times 0.6907]+0.63096$$

Haze and Color

The haze of the preforms and bottles was measured with a Hunter Lab ColorQuest II instrument. The haze is defined as the percent of diffused light to total transmitted light. The color of the bottle sidewalls was measured with the same instrument, and report in CIE units of L*, a* and b*.

Coefficient of Friction

Coefficient of static friction testing using ASTM D1894-01 was carried out on the bottle sidewalls at room temperature.

EXAMPLE 1

This example compares the preferred reactive liquid carrier of U.S. Pat. No. 6,569,991, polyethylene glycol (PEG), to that of the present invention.

A standard commercial polyester bottle resin (KoSa 3302, Spartanburg, S.C., USA) was used. PEG with a molecular weight of 400 was obtained from Union Carbide, Danbury Conn., USA. The cyclic anhydride was alkenyl succinic anhydrides (ASA), a mixture of alkenyl succinic anhydrides from Albemarle Corporation, Richmond, Va., U.S.A. that contains 54% hexadecenyl, 34% octadecenyl and 10% eicosodecenyl succinic anhydride The 3302 resin was dried under vacuum at 150° C. for 12 hours. The dried resin was blended with the liquid carrier and injected molded into 48 gram preforms on an Arburg injection molding machine.

The preform IV was measured and the results set forth in Table 2.

TABLE 2

| Additive | Amount, ppm | IV |
|---|---|---|
| None | None | 0.743 |
| ASA | 2,000 | 0.748 |
| ASA | 4,000 | 0.741 |
| PEG | 2,000 | 0.680 |
| PEG | 4,000 | 0.625 |

These results illustrate that the ASA did not cause any IV loss, since it reacted by ring opening with no byproduct, compared to PEG which transesterifies with the polyester resin giving water as a byproduct causing hydrolysis and a loss in molecular weight (IV).

The preform color and haze were measured and the results set forth in Table 3.

TABLE 3

| Additive | Amount, ppm | L* | a* | b* | Haze, % |
|---|---|---|---|---|---|
| None | None | 70.5 | −0.0 | 2.1 | 22 |
| ASA | 2,000 | 70.4 | −0.1 | 2.8 | 22 |
| ASA | 4,000 | 70.3 | −0.2 | 3.3 | 23 |
| PEG | 2,000 | 70.5 | 0.0 | 2.6 | 22 |
| PEG | 4,000 | 63.3 | 0.9 | 9.6 | 30 |

The ASA liquid carrier had little effect on the color and haze of the preform, in contrast to PEG which at a level of 4000 ppm significantly increased the yellowness (b*) and haze.

EXAMPLE 2

A mixture of ASA containing 5 wt.-% of a fumed silica, Cab-O-sil® M7D (Cabot Corporation, Boston Mass., USA) was prepared by stirring the fumed silica with the ASA liquid. Dried 3302 polyester resin was coated with this mixture by mixing in a bag, and then injected molded into 48 gram preforms on an Arburg injection molding machine. The level of ASA was 4,000 ppm (giving a fumed silica loading of 200 ppm). The coefficient of friction of the 3302 control was 9.3 compared to 0.2 with the anti-slip agent (fumed silica) incorporated into the resin with a cyclic anhydride.

EXAMPLE 3

The procedure of Example 2 was followed with a mixture of 81.2 wt-% ASA and 18.8 wt.-% of an UV absorber, Tinuvin 234 (Ciba Specialty Chemicals, Charlotte N.C., USA). The level of ASA was 4,000 ppm giving an UV absorber loading of 900 ppm.

The 24 gram preforms were blown into bottles (0.59 liter) on a Cincinnati Milacron stretch blow molding machine. The UV absorbance of the bottle side walls (0.38 mm) was measured. The % transmittance at 370 nm was less than 10% for the UV additive bottle compared to 80% for the 3302 control.

EXAMPLE 4

The procedure of Example 3 was followed using a mixture of 97.5 wt-% ASA and 2.5 wt.-% of a blue dye, Polysynthren Blue RBL (Clariant Corporation, Charlotte N.C., USA). The mixture was used at a level of 500 ppm. The color and haze of the bottle sidewalls was compared with commercial bottles in which the same concentration of blue dye was added with a hydrocarbon oil carrier, the results are set forth in Table 4.

TABLE 4

|  | L* | a* | b* | Haze, % |
|---|---|---|---|---|
| 3302, control | 95.5 | 0.1 | 0.7 | 4.4 |
| ASA carrier | 95.2 | −0.5 | −0.1 | 4.6 |
| Mineral oil carrier | 94.8 | −0.6 | −0.2 | 4.5 |

These results show that the cyclic anhydrides can be used to replace hydrocarbon oil carriers.

EXAMPLE 5

A common additive that is used in polyester bottle resin compositions is a reheat agent. These reheat agents reduce the time it takes for the preform to heat to the stretch blow molding temperature. U.S. Pat. No. 5,925,710 discloses the use of graphite as a reheat agent.

The procedure of Example 1 was followed to prepare a mixture of 99 wt.-% ASA and 1 wt.-% graphite (Grafitberg-bau Kaiserberg AG, Kaiserberg Austria). The mixture was used at a level of 1,000 ppm to give 10 ppm graphite in the resin.

In the perform reheat process a series of infra-red lamps are used to heat the preform to the stretch blowing temperature. By changing the power to these lamps the final preform temperature will change. The effect of the lamp power on preform temperature is set forth in Table 5.

TABLE 5

| % of full power | Preform Temperature ° C. | |
|---|---|---|
| Graphite, ppm | None | 10 |
| 81 | 89.3 | 98.3 |
| 84 | 91.0 | 100.0 |
| 87 | 93.0 | 102.7 |
| 90 | 94.0 | 104.7 |
| 93 | 96.7 | 105.7 |

These results indicate that a cyclic anhydride reactive carrier is an effective carrier to add reheat additives to polyester.

Thus it is apparent that there has been provided, in accordance with the invention, a polyester or polyamide resin, with a cyclic anhydride and additive, a process for making such a resin, a process for making an injected article from such a resin, and an injected molded article from such a resin that fully satisfies the objects, aims, and advantages set forth above. While the invention has been described in conjunction with the specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the present invention.

What is claimed is:

1. A resin comprising the reaction product of polyester with a substituted cyclic monoanhydride, said reaction product also containing an additive, wherein said substituted cyclic monoanhydride is selected from the group of octadecenyl succinic monoanhydride, hexadecenyl succinic monoanhydride, eicosodecenyl succinic monoanhydride, n-octenyl succinic monoanhydride, nonenyl succinic monoanhydride, and mixtures of these, and wherein the amount of said substituted cyclic monoanhydride is from about 100 to 10,000 ppm.

2. The resin of claim 1, wherein said polyester is made by the polycondensation of diols and diacids; said diols are ethylene glycol, 1,3-propane diol, 1,4-butane diol or 1,4-cyclohexanedimethanol; and said diacids are terephthalic acid, isophthalic acid or 2,6-naphthoic acid.

3. The resin of claim 2, wherein said polyester is polyethylene terephthalate, or a copolyester of polyethylene terephthalate with up to 20 wt-% of isophthalic acid or 2,6-naphthoic acid, and up to 10 wt-% of diethylene glycol or 1,4-cyclohexanedimethanol.

4. The resin of claim 2, wherein said polyester is polybutylene terephthalate, or a copolyester of polybutylene terephthalate with up to 20 wt-% of a dicarboxylic acid, and up to 20 wt-% of ethylene glycol or 1,4-cyclohexanedimethanol.

5. The resin of claim 2, wherein said polyester is polyethylene naphthalate, or a copolyester of polyethylene naphthalate with up to 20 wt-% of isophthalic acid, and up to 10 wt-% of diethylene glycol or 1,4-cyclohexanedimethanol.

6. The resin of claim 1, wherein said additive is selected from the group of colorants, anti-slip agents, flame retardants, antioxidants, oxygen gas barrier agents, carbon dioxide gas barrier agents, oxygen scavengers, ultraviolet (UV) radiation absorbers, acetaldehyde reducing agents, crystallization control agents, impact modifiers, catalyst deactivators, melt strength enhancers, anti-static agents, lubricants, chain extenders, nucleating agents, solvents, fillers, plasticizers, and a mixture of two or more of these.

7. A method of producing a resin for making sheets, films, fibers, preforms and containers, comprising: blending a substituted cyclic monoanhydride with an additive to form a mixture, and reacting said substituted cyclic monoanhydride in said mixture with polyester, wherein said substituted cyclic monoanhydride is selected from the group of octadecenyl succinic monoanhydride, hexadecenyl succinic monoanhydride, eicosodecenyl succinic monoanhydride, n-octenyl succinic monoanhydride, nonenyl succinic monoanhydride, and mixtures of these, and wherein the amount of said substituted cyclic monoanhydride is from about 100 to 10,000 ppm.

8. The method of claim 7, wherein said polyester is made by the polycondensation of diols and diacids; said diols are ethylene glycol, 1,3-propane diol, 1,4-butane diol or 1,4-cyclohexanedimethanol; and said diacids are terephthalic acid, isophthalic acid or 2,6-naphthoic acid.

9. The method of claim 8, wherein said polyester is polyethylene terephthalate, or a copolyester of polyethylene terephthalate with up to 20 wt-% of isophthalic acid or 2,6-naphthoic acid, and up to 10 wt-% of diethylene glycol or 1,4-cyclohexanedimethanol.

10. The method of claim 8, wherein said polyester is polybutylene terephthalate, or a copolyester of polybutylene terephthalate with up to 20 wt-% of isophthalic acid or 2,6-naphthoic acid, and up to 20 wt-% of ethylene glycol or 1,4-cyclohexanedimethanol.

11. The method of claim 8, wherein said polyester is polyethylene naphthalate, or a copolyester of polyethylene naphthalate with up to 20 wt-% of isophthalic acid, and up to 10 wt-% of diethylene glycol or 1,4-cyclohexanedimethanol.

12. The method of claim 7, wherein said additive does not react with said substituted cyclic monoanhydride.

13. The method of claim 7, wherein said additive is selected from the group of colorants, anti-slip agents, flame retardants, antioxidants, oxygen gas barrier agents, carbon dioxide gas barrier agents, oxygen scavengers, ultraviolet (UV) radiation absorbers, acetaldehyde reducing agents, crystallization control agents, impact modifiers, catalyst deactivators, melt strength enhancers, anti-static agents, lubricants, chain extenders, nucleating agents, solvents, fillers, plasticizers, and a mixture of two or more of these.

14. The method of claim 7, wherein said resin is melt extruded into articles such as sheets, films, fibers, preforms and containers.

15. An article such as sheets, films, fibers, preforms and containers made from a resin comprising the reaction product of polyester with substituted cyclic monoanhydride, wherein said reaction product also contains an additive, wherein said substituted cyclic monoanhydride is selected from the group of octadecenyl succinic monoanhydride, hexadecenyl succinic monoanhydride, eicosodecenyl succinic monoanhydride, n-octenyl succinic monoanhydride, nonenyl succinic monoanhydride, and mixtures of these, and wherein the amount of said substituted cyclic monoanhydride is from about 100 to 10,000 ppm.

* * * * *